United States Patent
Zhu et al.

(10) Patent No.: US 11,444,867 B2
(45) Date of Patent: Sep. 13, 2022

(54) PACKET SENDING METHOD AND RELATED DEVICE

(71) Applicant: Huawei Technologies Co., Ltd., Shenzhen (CN)

(72) Inventors: Jianjian Zhu, Shenzhen (CN); Yu Deng, Shanghai (CN); Wei Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 16/991,493

(22) Filed: Aug. 12, 2020

(65) Prior Publication Data

US 2020/0374217 A1 Nov. 26, 2020

Related U.S. Application Data

(63) Continuation of application No. PCT/CN2019/073261, filed on Jan. 25, 2019.

(30) Foreign Application Priority Data

Feb. 12, 2018 (CN) .......................... 201810148231.5

(51) Int. Cl.
*H04L 12/24* (2006.01)
*H04L 45/24* (2022.01)
(Continued)

(52) U.S. Cl.
CPC .............. *H04L 45/24* (2013.01); *H04L 47/20* (2013.01); *H04L 47/34* (2013.01); *H04L 47/36* (2013.01)

(58) Field of Classification Search
CPC ............ H04L 12/4633; H04L 61/2007; H04L 61/2592; H04L 1/00; H04L 1/16;
(Continued)

(56) References Cited

U.S. PATENT DOCUMENTS 10,833,735 B2 * 11/2020 Byun ...................... H04L 27/26
2009/0016463 A1 * 1/2009 Roh ...................... H04B 7/0626
375/295
(Continued)

FOREIGN PATENT DOCUMENTS

CN 102546106 A 7/2012
CN 103326831 A 9/2013
(Continued)

OTHER PUBLICATIONS

Minshall, G., et al. "A Proposed Modification to Nagle's Algorithm," draft-minshall-nagle-01, Jun. 17, 1999, 8 pages.
(Continued)

*Primary Examiner* — Phuc H Tran
(74) *Attorney, Agent, or Firm* — Conley Rose, P.C.

(57) ABSTRACT

A packet sending method includes determining, that a multipath connection meets a first condition, where the first condition is used to disable a small packet sending control policy used for the multipath connection, the small packet sending control policy is used to control a time interval at which the sender sends small packets using the multipath connection, and a length of data included in the small packet is less than a maximum segment size (MSS), disabling, by the sender, the small packet sending control policy, and sending, by the sender, a plurality of small packets on a plurality of paths of the multipath connection in a redundant transmission mode after disabling the small packet sending control policy.

20 Claims, 6 Drawing Sheets

(51) Int. Cl.
*H04L 47/20* (2022.01)
*H04L 47/34* (2022.01)
*H04L 47/36* (2022.01)

(58) Field of Classification Search
CPC . H04L 1/22; H04L 45/24; H04L 47/12; H04L 47/20; H04L 47/32; H04L 47/34; H04L 47/36; H04L 69/14; H04W 16/32; H04W 28/0252; H04W 40/00; H04W 40/02; H04W 48/16; H04W 76/12; H04W 76/15; H04W 8/00; H04W 8/26; H04W 92/20; H04W 72/04; H04W 72/12; H04B 7/0621; H04B 7/0632; H04B 7/0634; H04B 7/065; H04B 7/066; H04B 7/0671; H04B 7/0689
See application file for complete search history.

(56) References Cited

U.S. PATENT DOCUMENTS

| | | | |
|---|---|---|---|
| 2012/0201186 A1* | 8/2012 | Awano | H04L 12/1877 370/312 |
| 2012/0226802 A1* | 9/2012 | Wu | H04L 1/1887 709/224 |
| 2016/0127083 A1 | 5/2016 | Li | |
| 2017/0366450 A1 | 12/2017 | Gattani | |
| 2018/0034691 A1* | 2/2018 | Amend | H04L 45/24 |
| 2018/0103123 A1* | 4/2018 | Skog | H04L 69/14 |
| 2019/0097760 A1 | 3/2019 | Hwang et al. | |
| 2020/0162588 A1* | 5/2020 | Kucera | H04L 69/22 |

FOREIGN PATENT DOCUMENTS

| | | |
|---|---|---|
| CN | 103503357 A | 1/2014 |
| CN | 103840917 A | 6/2014 |
| CN | 103905463 A | 7/2014 |
| CN | 105099620 A | 11/2015 |
| CN | 106254202 A | 12/2016 |
| CN | 106656856 A | 5/2017 |
| KR | 20170142513 A | 12/2017 |
| WO | 2017194172 A1 | 11/2017 |
| WO | 2017220149 A1 | 12/2017 |
| WO | 2017222259 A1 | 12/2017 |

OTHER PUBLICATIONS

Yedugundla, K., et al. "Is multi-path transport suitable for latency sensitive traffic?," Computer Networks 105 (2016), pp. 1-21.
Frommgen, A., "A Programming Model for Application-defined Multipath TCP Scheduling," Middleware, 2017, Las Vegas, NV, USA, pp. 134-146.
Datar, K., "Best Practices for TCP Optimization in 2019," BLOG, Retrieved from the internet:"https://www.extrahop.com/company/blog/2016/tcp-nodelay-nagle-quickack-best-practices/", Jun. 29, 2019, 9 pages.
Sun Lin,"Study of Multicast Routing Algorithm Based on QoS", A Dissertation Submitted for the Degree of Master, Chang"an University , Xi"an, China, Jun. 2007, total 80 pages. With an English Abstract.
Jinhwan Kim et al.,"Receive Buffer based Path Management for MPTCP in Heterogeneous Networks", 2017 IFIP/IEEE Symposium on Integrated Network and Service Management (IM), Jul. 24, 2017, total 4 pages.
Wu, J., et al., "Streaming High-Quality Mobile Video with Multipath TCP in Heterogeneous Wireless Networks," IEEE Transactions On Mobile Computing, vol. 15, No. 9, XP011618393, Sep. 1, 2016, pp. 2345-2361.
Scharf, M., et al., "MPTCP Application Interface Considerations," draft-scharf-mptcp-api-00.txt, XP015064564, Oct. 15, 2009, 14 pages.
Weizi, M., et al., "On the Usage of Transport Features Provided by IETF Transport Protocols," draft-ietf-taps-transports-usage-09.txt, No. 9, XP015122511, Oct. 26, 2017, pp. 1-57.
"Transmission Control Protocol—Wikipedia," Nov. 28, 2017, XP055642012, 12 pages.
RFC 6897, M. Scharf, "Multipath TCP (MPTCP) Application Interface Considerations," Mar. 2013, 31 pages.

* cited by examiner

PACKET SENDING METHOD AND RELATED DEVICE

CROSS-REFERENCE TO RELATED APPLICATIONS

This application is a continuation of International Patent Application No. PCT/CN2019/073261, filed on Jan. 25, 2019, which claims priority to Chinese Patent Application No. 201810148231.5, filed on Feb. 12, 2018. The disclosures of the aforementioned applications are hereby incorporated by reference in their entireties.

TECHNICAL FIELD

This application relates to the communications field, and in particular, to a packet sending method and a related device.

BACKGROUND

Currently, in a multipath transmission technology, a throughput is increased through parallel transmission on a plurality of paths, or service continuity and reliability are implemented using a plurality of paths. For example, a common multipath transmission technology is the Multipath Transmission Control Protocol (MPTCP). The multipath transmission technology may support multipath transmission in one connection, in an embodiment, data on a single path is distributed and separately transmitted on different subflows. In this way, there are a plurality of paths between two addresses in the connection, and therefore a risk that the addresses are unreachable is reduced, and the connection is not interrupted in a process of increasing or changing a transmission path. In addition, a redundant scheduling policy is introduced into the multipath transmission, in an embodiment, an unacknowledged packet in a Transmission Control Protocol (TCP) data sending queue is repeatedly sent on a plurality of subflows in order to improve reliability of data transmission at an application layer, reduce a delay and jitter of data transmission at a service layer, and reduce a packet loss ratio of data at the service layer. For example, the plurality of subflows may include a WI-FI network and a cellular network, and the cellular network may be a fifth generation (5G) network, a fourth generation (4G) network such as a Long Term Evolution (LTE,) network, a third generation (3G) network such as a code division multiple access (CDMA) network, a second generation (2G) network, or the like.

However, to increase a payload in a sent packet, a small packet sending control policy is enabled. In the small packet sending control policy, when a sender has a small packet that has been sent but is not acknowledged, the sender is not allowed to continue to send a small packet. When the redundant scheduling policy is used to attempt to repeatedly send a small packet on a plurality of subflows of a multipath connection, a plurality of small packets that carry same data cannot be sent on the plurality of paths in a timely manner because of the small packet sending control policy, but the small packets continue to be sent after acknowledgement (ACK) packets corresponding to the small packets are returned. Consequently, data transmission efficiency is affected.

SUMMARY

Embodiments of this application provide a packet sending method and a related device in order to improve data transmission efficiency.

According to a first aspect, an embodiment of this application provides a packet sending method, including determining, by a sender, that a multipath connection meets a first condition, where the first condition is used to disable a small packet sending control policy used for the multipath connection, the small packet sending control policy is used to control a time interval at which the sender sends small packets using the multipath connection, and a length of data included in the small packet is less than a maximum segment size (MSS), disabling the small packet sending control policy, and sending, by the sender, a plurality of small packets on a plurality of paths of the multipath connection in a redundant transmission mode after disabling the small packet sending control policy, where the plurality of small packets include small packets that carry same data. In this way, when a protocol stack enables the small packet sending control policy, and data needs to be transmitted in the redundant transmission mode, the small packet sending control policy can be adaptively disabled when the condition is met, using an added determining mechanism, and there is no need to modify a default setting in the protocol stack that is for enabling the small packet sending control policy. After the small packet sending control policy is disabled, the plurality of small packets that carry the same data are sent on the plurality of paths in the redundant transmission mode, to improve data transmission efficiency.

The first condition includes at least one of the following a redundant scheduling policy has been configured for the sender, a scheduling policy of the multipath connection is a redundant scheduling policy, a redundant scheduling policy has been configured for a receiver of the multipath connection, the small packet is a packet sent using a redundant scheduling policy, the small packet needs to be repeatedly sent on another path of the multipath connection after being sent on one path of the multipath connection, and the sender currently sends packets on the plurality of paths of the multipath connection, where the redundant scheduling policy is used to instruct the sender to transmit data in the redundant transmission mode.

It should be understood that, after the sender sends a small packet on one path of the multipath connection, if the small packet is lost or fails to be sent in a transmission process, a small packet that carries same data needs to be resent on another path of the multipath connection in the redundant transmission mode. In this case, the small packet sending control policy also needs to be disabled, and the small packet is resent on the other path in the redundant transmission mode after the small packet sending control policy is disabled.

In a possible design, a method for determining that the small packet is lost or fails to be sent in the transmission process includes at least the following. If the sender does not receive, within preset duration, an acknowledgement packet corresponding to a small packet after sending the small packet on one path of the multipath connection, the sender may determine that the small packet is lost or fails to be sent, or after sending a small packet on one path of the multipath connection, the sender sends a large packet on at least one path that is of the multipath connection and on which no small packets are sent, and if the sender does not receive an acknowledgement packet corresponding to the small packet before receiving an acknowledgement packet corresponding to the large packet, the sender may determine that the small packet is lost or fails to be sent.

It should be understood that data in the small packet includes a header of a protocol above the TCP protocol, for example, a header of a remote procedure call (RPC) protocol or a header of a Hypertext Transfer Protocol (HTTP), but does not include a TCP header or a header at a lower layer (or bottom layer), for example, the Internet Control Message Protocol (ICMP). Therefore, the length of the data included in the small packet is a sum of a length of payload data and a length of the header of the protocol above the TCP protocol. When the sum of the length of the payload data and the length of the header of the protocol above the TCP protocol is less than the MSS, the small packet sending control policy takes effect, and whether to disable the small packet sending control policy used for the multipath connection needs to be determined.

In a possible design, after sending the small packet to the receiver, the sender is not allowed to send a small packet that carries same data as the small packet before receiving a returned ACK packet corresponding to the small packet.

In another possible design, the sender may preset a timing time, and after sending the small packet to the receiver, the sender is not allowed to send a small packet that carries same data as the small packet before the preset timing time is reached.

In another possible design, the sender may start a sending blocking condition, and the sending blocking condition is used to indicate that after sending the small packet, the sender is not allowed to send a small packet that carries same data as the small packet before receiving a returned ACK packet corresponding to the small packet. If small packets are combined into a large packet after a period of time, the sender is allowed to send the combined large packet to the receiver.

In the foregoing three manners, the time interval at which the sender sends the small packets using the multipath connection can be controlled, to implement the small packet sending control policy, and increase a payload in a sent packet.

In a possible design, the sender stops executing the small packet sending control policy. For example, the sender skips control logic corresponding to the small packet sending control policy when being to execute the control logic, or directly disables control logic corresponding to the small packet sending control policy after determining that the condition is met.

In another possible design, the sender modifies a sequence number corresponding to a first small packet in the sender, or modifies a sequence number of a first ACK packet received by the sender such that the sequence number corresponding to the first small packet in the sender is less than or equal to the sequence number of the first ACK packet, where the first small packet is a last small packet sent by the sender before a current moment, the sender does not receive an ACK packet corresponding to the first small packet, and the first ACK packet is an ACK packet with a largest sequence number that is received by the sender before the current moment.

In another possible design, the sender modifies a quantity of unacknowledged small packets stored in the sender into 0, where the quantity of unacknowledged small packets is used to indicate a quantity of small packets that have been sent by the sender but for which corresponding ACK packets are not received.

In another possible design, a timer is used to control the time interval at which the sender sends the small packets using the multipath connection, and the sender modifies the timer after sending a first small packet using the multipath connection such that the timer reaches a preset time in advance, where the first small packet is a last small packet sent by the sender before a current moment.

In the foregoing four manners, when a protocol stack enables the small packet sending control policy, and data needs to be transmitted in the redundant transmission mode, the small packet sending control policy may be disabled, and there is no need to continue to send the small packet after the ACK packet corresponding to the first small packet is returned in order to improve data transmission efficiency.

In a possible design, because the sender skips the control logic corresponding to the small packet sending control policy when being to execute the control logic, or disables the control logic corresponding to the small packet sending control policy after determining that the condition is met, the sender may send the plurality of small packets on the plurality of paths of the multipath connection in the redundant transmission mode.

In another possible design, after the sender modifies the sequence number corresponding to the first small packet in the sender, or modifies the sequence number of the first ACK packet received by the sender, the sequence number corresponding to the first small packet in the sender is less than or equal to the sequence number of the first ACK packet, which may indicate that the sender has received ACK packets corresponding to all the small packets. In this way, the sender may not need to wait to send the small packet after the ACK packet corresponding to the first small packet is returned in order to disable the small packet sending control policy. Therefore, the sender is allowed to send, on at least one path that is in the plurality of paths of the multipath connection and on which the first small packet is not sent, a small packet that carries same data as the first small packet. After sending the small packet that carries the same data as the first small packet, the sender may remodify the sequence number corresponding to the first small packet in the sender or remodify the sequence number of the first ACK packet received by the sender, which may also indicate that the sender has received ACK packets corresponding to all the small packets. In this way, the sender may not need to wait to send the small packet after the ACK packet corresponding to the small packet is returned in order to disable the small packet sending control policy, and send a second small packet on the plurality of paths of the multipath connection in the redundant transmission mode.

In another possible design, because the sender modifies the quantity of unacknowledged small packets stored in the sender into 0, the sender may not need to wait to send the small packet after the ACK packet corresponding to the unacknowledged small packet is returned in order to disable the small packet sending control policy. Then, the sender may send, on another path that is in the plurality of paths of the multipath connection and on which the first small packet is not sent, a small packet that carries same data as the first small packet. Next, the sender modifies the quantity of unacknowledged small packets into 0, and may send, on still another path that is in the plurality of paths of the multipath connection and on which the first small packet is not sent, a small packet that carries same data as the first small packet. By analogy, each time after a small packet is sent, the quantity of unacknowledged small packets is always 0, or the quantity of unacknowledged small packets is modified into 0 such that the sender can send another small packet in a timely manner.

In another possible design, after sending the first small packet using the multipath connection, the sender has modified the timer such that the timer reaches the preset time in advance. Therefore, before the sender receives the ACK packet corresponding to the first small packet, when the timer reaches the preset time in advance, the sender may send, the small packet that carries same data as the first small packet, in the redundant transmission mode on a path that is in the plurality of paths of the multipath connection and on which the first small packet is not sent. In addition, after sending the small packet that carries the same data as the first small packet, the sender may remodify the timer such that the timer reaches the preset time in advance, and sends a second small packet on a path of the multipath connection when the timer reaches the preset time in advance again.

In the foregoing four cases, because the small packet sending control policy is disabled, the sender may send, on the plurality of paths in the redundant transmission mode, a plurality of small packets that carry same data in order to improve data transmission efficiency.

It should be understood that, when the timer reaches the preset time in advance, the small packet that carries the same data as the first small packet may be immediately sent on the path that is in the plurality of paths of the multipath connection and on which the first small packet is not sent. Alternatively, there is a latency in a code execution process or sending-related preparation steps (for example, packet encapsulation and transferring a packet to hardware, for example, a network interface card, for processing) in some existing packet sending procedures need to be performed. Therefore, when the timer reaches the preset time in advance, the timer may be delayed for a period of time, and then the small packet that carries the same data as the first small packet is sent on the path that is in the plurality of paths of the multipath connection and on which the first small packet is not sent.

According to a second aspect, an embodiment of this application provides a packet sending apparatus, where the apparatus is a sender of a multipath connection, and includes a determining module configured to determine that a multipath connection meets a first condition, where the first condition is used to disable a small packet sending control policy used for the multipath connection, the small packet sending control policy is used to control a time interval at which the sender sends small packets using the multipath connection, and a length of data included in the small packet is less than a MSS, a processing module configured to disable the small packet sending control policy, and a sending module configured to send a plurality of small packets on a plurality of paths of the multipath connection in a redundant transmission mode after the small packet sending control policy is disabled, where the plurality of small packets include small packets that carry same data. In this way, when a protocol stack enables the small packet sending control policy, and data needs to be transmitted in the redundant transmission mode, the small packet sending control policy can be adaptively disabled when the condition is met, using an added determining mechanism, and there is no need to modify a default setting in the protocol stack that is for enabling the small packet sending control policy. After the small packet sending control policy is disabled, the plurality of small packets that carry the same data are sent on the plurality of paths in the redundant transmission mode, to improve data transmission efficiency.

It should be understood that the second aspect describes the apparatus corresponding to the first aspect, namely, the foregoing sender, in an embodiment, an end for sending a small packet, and various specific implementations, descriptions, and technical effects of the apparatus are not described again.

According to a third aspect, an embodiment of this application provides a packet sending device, including a processing circuit, a communications interface, and a storage medium, where the storage medium stores a protocol stack program, the communications interface is configured to execute the protocol stack program to receive a packet from another device or send a packet to another device, and the processing circuit is configured to run an instruction in the storage medium using the communications interface, to implement the packet sending method according to the first aspect and the implementations of the first aspect.

In a possible design, the packet sending device provided in this application may include corresponding modules configured to perform behavior of the packet sending apparatus in the foregoing method design. The modules may be software and/or hardware.

It should be understood that the third aspect describes the apparatus corresponding to the first aspect or the second aspect, namely, the foregoing sender, and various specific implementations, descriptions, and technical effects of the apparatus are not described again.

According to a fourth aspect, this application provides a computer readable storage medium, where the computer readable storage medium stores an instruction, and when the instruction is run on a computer, the computer performs the method according to all of the foregoing aspects.

According to a fifth aspect, this application provides a computer program product including an instruction, where when the computer program product is run on a computer, the computer performs the method according to all of the foregoing aspects.

DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes the embodiments of this application with reference to the accompanying drawings in the embodiments of this application.

The following describes some terms appearing in this application.

Host. The host is an end node configured to initiate or receive a multipath connection, in other words, a sender or a receiver of a multipath connection. For example, the host may run on a terminal or a server.

Path. The path is a link between a sender and a receiver. The path may be identified using a four-tuple, and the four-tuple is used to indicate a pair of a source address (and/or port) and a destination address (and/or port). It should be understood that both a receiver and a sender that support an MPTCP technology may prepare a plurality of addresses on hosts of the receiver and the sender, to identify a plurality of paths. In addition, a plurality of paths between a pair of a receiver and a sender may share one or more routers.

Subflow. The subflow is a flow of a TCP segment running on a single path. The subflow is a part of a multipath connection. A start and termination of the subflow are similar to those of a regular TCP connection.

Multipath connection. The multipath connection is a group of subflows that may communicate with each other between two hosts over an application, and the group of subflows include a plurality of subflows. Connections are in one-to-one mapping to sockets of applications.

Packet. The packet is a package of data with a header, and the header may be logically complete or incomplete. The packet is usually physical packaging of data, or certainly may be logical packaging data. The concept of the packet is used to describe data interaction between a host and a network connected to the host.

ACK packet. The ACK packet is also referred to as an acknowledgement packet, an ACK, an ACK packet, a feedback packet, or a notification. In this application, the acknowledgement packet may be used by a receiver to feed back, to a sender, information about a packet that is received or not received, the acknowledgement packet includes feedback information, and the feedback information is also referred to as ACK information, for example, a sequence number of a specific packet. In other approaches, feedback information of a packet usually indicates that a receiver notifies a sender that the packet has been received.

This application is applied to a multipath transmission technology. In the multipath transmission technology, data is transmitted using a plurality of paths, and the plurality of paths may be two or more paths. Data transmitted on the plurality of paths is usually different. In a multipath transmission protocol, data of a connection is distributed to a plurality of subflows, and a part of the data of the connection is transmitted on each of the plurality of subflows. For ease of description, in this application, such a transmission mode is referred to as a multipath transmission mode that is also referred to as a multipath mode. However, in some special scenarios, for example, in a scenario in which a very strict requirement is imposed on data reliability, or in a scenario in which a relatively strict requirement is imposed on a delay, another transmission mode may be used, namely, a redundant transmission mode that is also referred to as a redundant mode. In the redundant transmission mode, a packet in a connection is repeatedly transmitted on a plurality of subflows of the connection. In other words, data of a connection is repeatedly transmitted on a plurality of subflows. For example, in the redundant transmission mode, same data needs to be sent once on each subflow of a multipath transmission connection. In this transmission mode, advantages of the multipath transmission technology apparently cannot be used, and devices of a sender and a receiver of the data need to provide a higher hardware configuration to process at least one piece of redundant data. Consequently, higher device configuration costs are caused. In addition, it should be noted that for a multipath transmission connection, data can be transmitted on n paths, and n is greater than 1. A default multipath transmission mode is that the data is transmitted using the n paths. However, the data may be transmitted using one or more of the n paths.

The multipath transmission technology may be applied to a plurality of protocols such as the MPTCP, the User Datagram Protocol (UDP), and the Quick UDP Internet Connection (QUIC) protocol. The MPTCP is used as an example for description in this application.

In a current common multipath transmission scenario, there are usually two subflows, namely, a cellular network and a WI-FI network. However, it can be predicted that a transmission scenario in which there are more than two subflows is increasingly popularized. For example, there may be a plurality of operators in an area in a wide area network, and consequently the area supports TCP data transmission on more than two subflows. For another example, multipath TCP data transmission on three or more subflows may be supported in a data center using an equal-cost multi-path (ECMP) routing technology.

Figure 1:
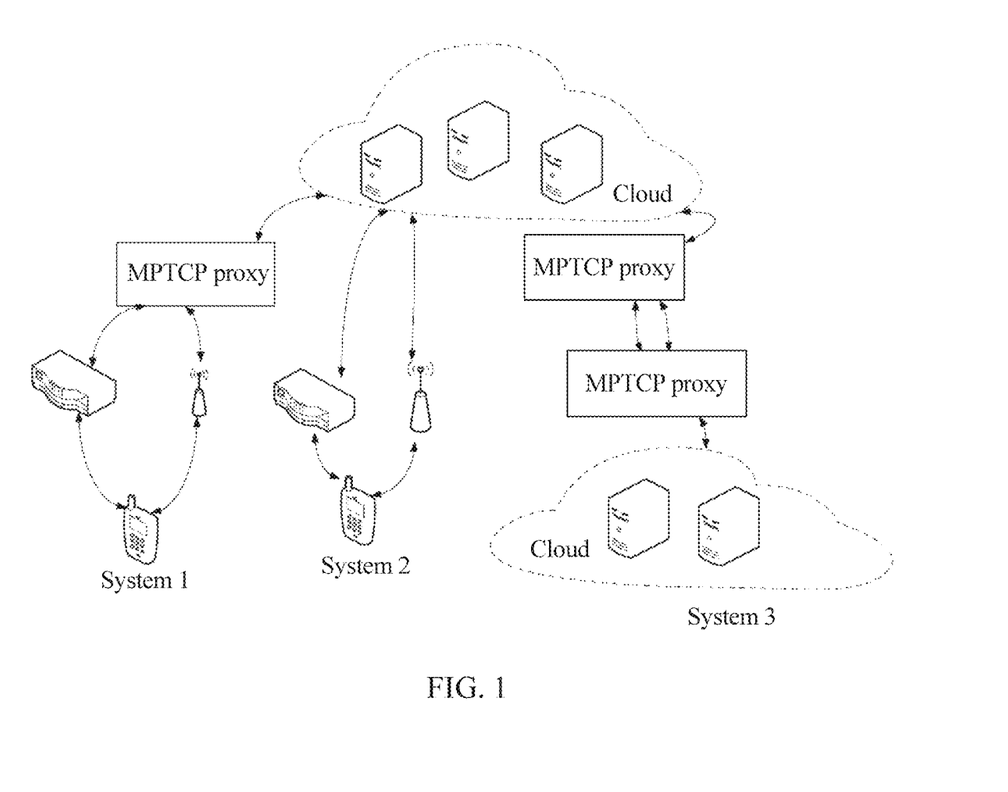
FIG. 1 is a schematic structural diagram of a multipath system according to an embodiment of this application.

The MPTCP technology may be applied to a plurality of networking systems. Generally, if information needs to be transmitted using the MPTCP technology, at least one link between a sender and a receiver of the information should support the MPTCP technology. FIG. 1 briefly shows three network systems that can use the technology. For ease of description, FIG. 1 shows two paths in the multipath system as an example for which a WI-FI technology (indicated using a router) and a cellular network (indicated using a base station) are respectively used, where a cloud draws several cloud servers as an example. It should be understood that the diagram shows only a connection between the cloud and another device as an example, and does not clearly show a connection between a specific server of the cloud and another device. In a system 1 in FIG. 1, a terminal communicates with the cloud. If a device, of the cloud, that communicates with the terminal does not support the MPTCP technology but the terminal supports the technology, or if a device of the cloud supports the MPTCP technology but the terminal does not, to use the technology, one side that does not support the technology needs to interact with the other side using a proxy (for example, a gateway) that supports the MPTCP technology. In a system 2 in FIG. 1, both the cloud and a terminal support the MPTCP technology. In a system 3 in FIG. 1, a scenario in which two clouds communicate with each other is described. Both the two clouds may support the multipath transmission technology, or at least one end may not support the technology provided that the end that does not support the technology use a proxy (for example, a gateway) that supports the MPTCP technology. FIG. 1 shows a scenario in which both the two clouds use proxies that support the MPTCP technology such that gateways on the two sides communicate with each other using the technology.

The cloud may include a plurality of devices such as servers. Generally, a TCP connection related to a cloud is that a device of the cloud communicates with a peer end.

Figure 2:
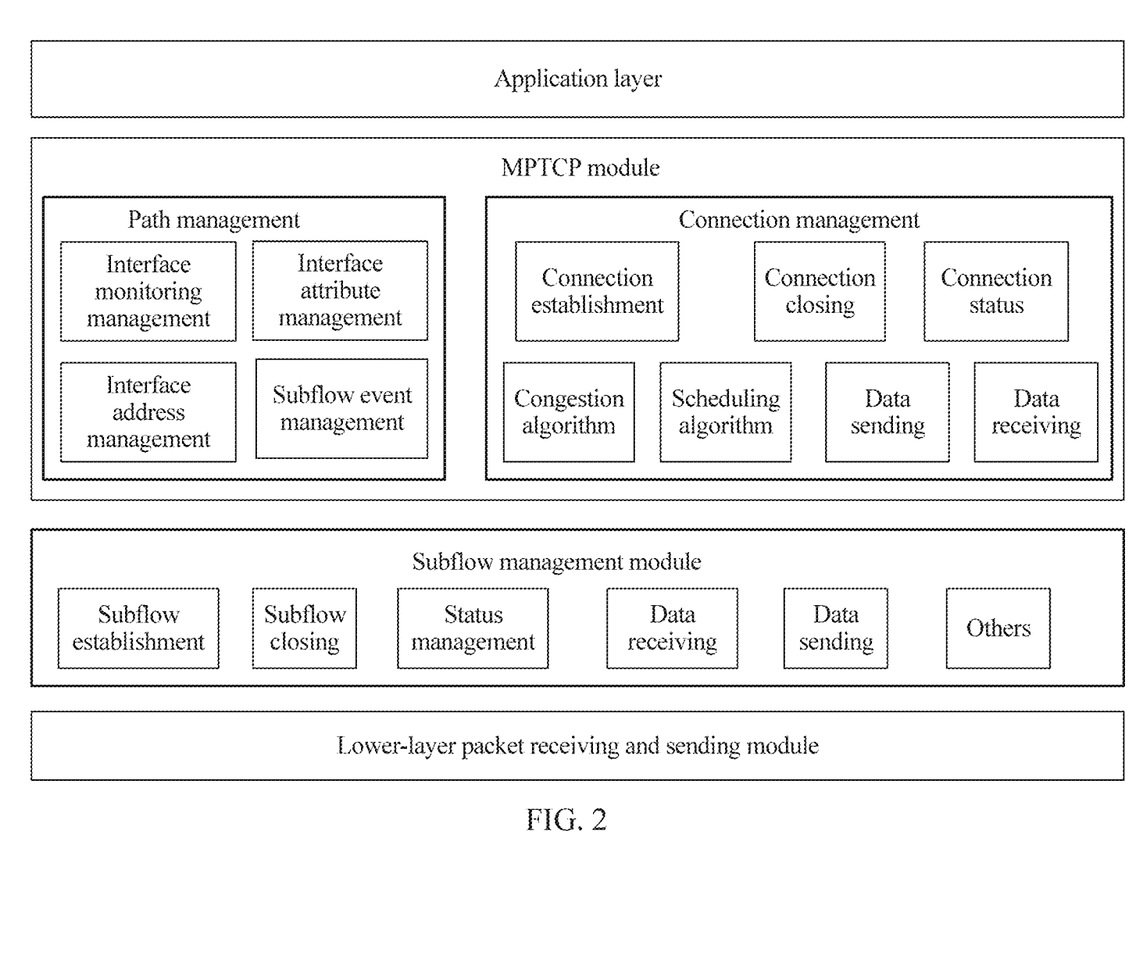
FIG. 2 is an overall architectural diagram of a device that supports an MPTCP technology according to an embodiment of this application.
Figure 7:
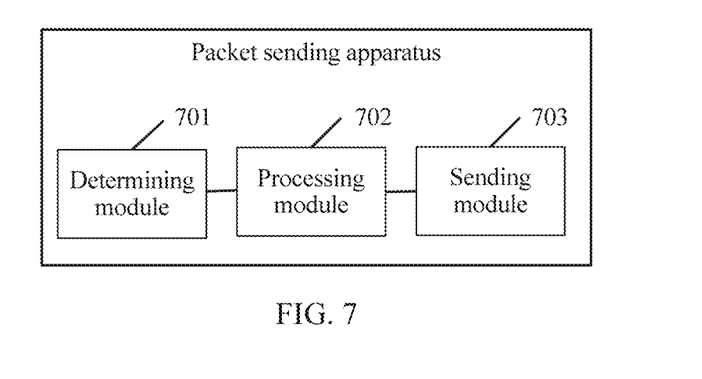
FIG. 7 is a schematic structural diagram of a packet sending apparatus according to an embodiment of this application.

FIG. 2 is an overall architectural diagram of a device that supports an MPTCP technology according to an embodiment of this application. Based on a hierarchical relationship of a logical architecture, an application layer, an MPTCP module, a subflow management module, and a lower-layer packet receiving and sending module are included as an example. The MPTCP module and the subflow management module may belong to a network transport layer, and the lower-layer packet receiving and sending module may belong to a hardware layer and a hardware driver layer. The subflow management module includes subflow establishment, subflow closing, status management, data receiving, data sending, and the like. The MPTCP module includes path management and connection management. The path management includes interface status monitoring, interface attribute management, interface address management, subflow event processing, and the like. The connection management includes connection establishment, connection closing, connection statuses, congestion algorithms, scheduling algorithms, data sending, data receiving, and the like. In this embodiment of this application, control parameters (such as a sequence number, a quantity, and a preset time) of the scheduling algorithm and a determining condition of the data sending in the MPTCP module are mainly improved. It should be understood that the architecture shown in FIG. 2, especially the description of the MPTCP module, is also applicable to a cloud device and an MPTCP proxy. For a method and a device that are described in this application, in an implementation, functions of a determining module 701 and a processing module 702 that are shown in FIG. 7 may be implemented by the MPTCP module shown in FIG. 2, in other words, the MPTCP module may perform method steps corresponding to the determining module 701 and the processing module 702, and functions of a sending module 703 shown in FIG. 7 may be implemented by the lower-layer packet receiving and sending module shown in FIG. 2, in other words, the lower-layer packet receiving and sending module may perform method steps corresponding to the sending module 703.

A small packet sent in this application is delivered from an application layer of a sender to the MPTCP module, and then the small packet is allocated onto each TCP subflow. A lower-layer packet receiving and sending module of the sender sends the small packet to a network, and after being transmitted by the network, the small packet is received by a peer end hardware that supports the MPTCP technology and reported by the peer end hardware to a transport layer. After being parsed and integrated, the small packet is reported by the transport layer to an application layer of the peer end. In this way, data transmission is completed.

Figure 3:
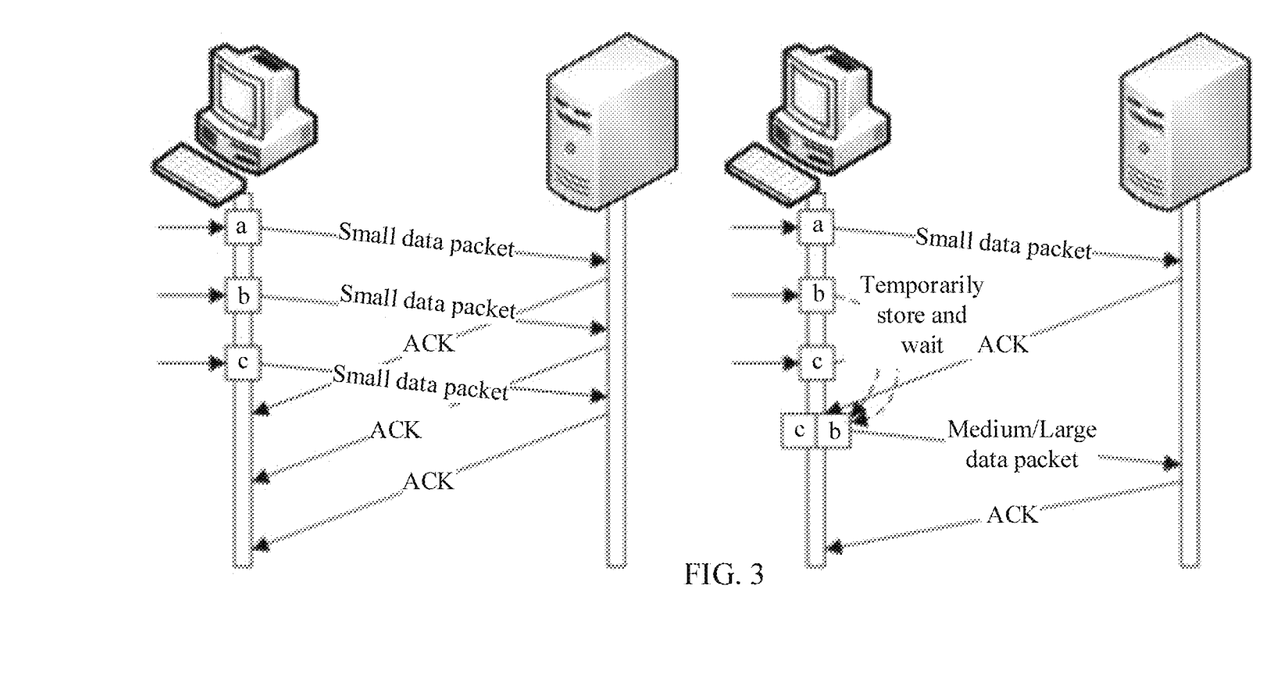
FIG. 3 is a schematic diagram of sending small data packet according to an embodiment of this application.

As shown in FIG. 3, a diagram on the left in FIG. 3 is a schematic diagram of sending small data packet without enabling a small packet sending control policy. A sender may continuously send a plurality of small packets (a small packet a, a small packet b, and a small packet c) to a receiver. After receiving each small packet, the receiver returns an ACK packet corresponding to the small data packet to the sender. A diagram on the right in FIG. 2 is a schematic diagram of sending small data packet with a small packet sending control policy enabled. After sending the small packet to the receiver, the sender waits for the receiver to return an ACK packet corresponding to the small packet a. In this case, the small packet b and the small packet c have been temporarily stored, and are combined into a medium/large packet. After receiving the ACK packet returned by the receiver, the sender is allowed to send the medium/large packet to the receiver.

Figure 4:
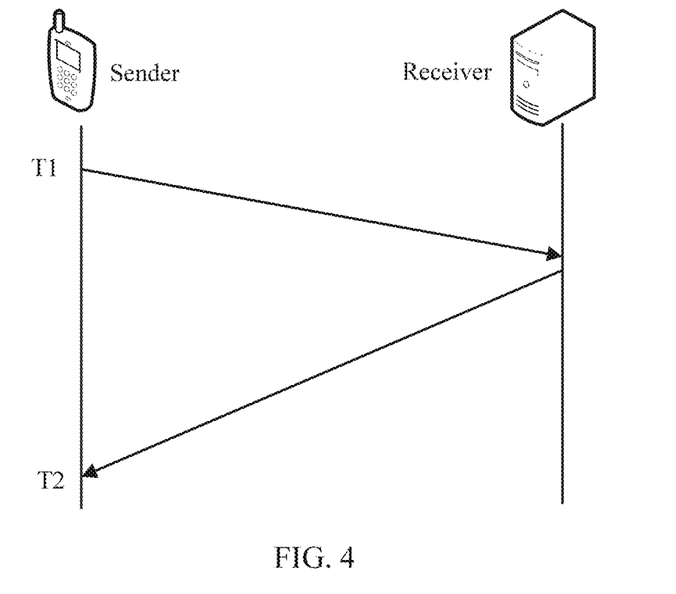
FIG. 4 is a schematic diagram of a transmission delay test according to an embodiment of this application.

To test impact of the small packet sending control policy on a transmission delay generated when a small packet is sent using a redundant scheduling policy, when performing data interaction and transmission using the redundant scheduling policy, the sender and the receiver disconnect an LTE interface or a WI-FI interface, to test a data transmission delay at a service layer. FIG. 4 is a schematic diagram of a transmission delay test according to an embodiment of this application. First, a sender sends a small packet to a receiver, and records timestamp information for sending the small packet, for example, T1. Each small packet carries a sequence number of the small packet. Then, after receiving the small packet sent by the sender, the receiver returns an ACK packet to the sender. The ACK carries a sequence number that is the same as the sequence number of the small packet. Next, when receiving the ACK packet sent by the receiver, the sender records timestamp information for receiving the ACK packet, for example, T2, and obtains the timestamp information T1 of small data packet based on the sequence number carried in the ACK packet. Finally, the timestamp information T1 is subtracted from the timestamp information T2, to obtain a transmission delay (T2−T1) of the small packet through calculation.

Figure 5:
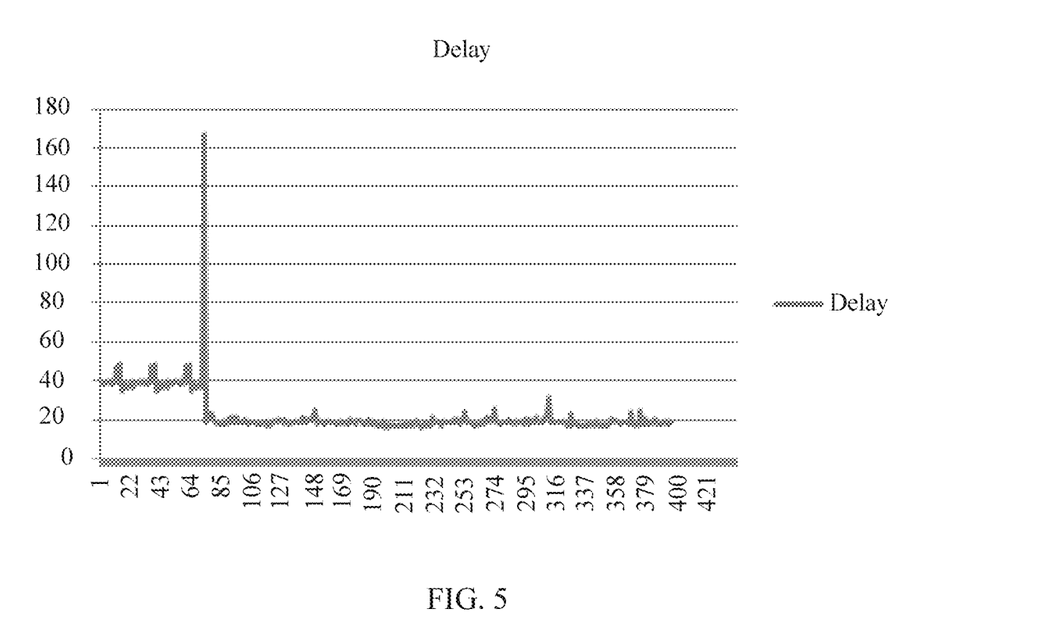
FIG. 5 is a schematic diagram of transmission delay statistics according to an embodiment of this application.

FIG. 5 is a schematic diagram of transmission delay statistics according to an embodiment of this application. A horizontal coordinate indicates a sequence number of a small packet, and a vertical coordinate indicates a transmission delay of each small packet that is recorded in a test process. A delay generated when a small packet is transmitted through a WI-FI interface is approximately 40 milliseconds (ms), and a delay generated when a small packet is transmitted through an LTE interface is approximately 20 ms. If small packets are repeatedly sent on two subflows using a redundant scheduling policy, a recorded transmission delay of each small packet should be approximately 20 ms. It may be learned from FIG. 5 that, when switching from the WI-FI interface to the LTE interface is performed for transmission, small packets are repeatedly sent on two subflows, and transmission delays of the small packets significantly fluctuate. This is mainly because when a sender sends a small packet on one subflow thereof, a small packet is allowed to fly in the air. In this case, the first small packet may be successfully sent. When the sender schedules a small packet that carries same data such that the small packet is repeatedly sent on the other subflow, a small packet sending control policy takes effect. Because there is a small packet that flies in the air, the sender is not allowed to resend a small packet. Consequently, transmission delays of the small packets significantly fluctuate.

In conclusion, when the redundant scheduling policy is used to attempt to repeatedly send a small packet on a plurality of subflows of an MPTCP connection, or when the redundant scheduling policy is used to attempt to send, on a plurality of paths, a plurality of small packets that carry same data, the small packets cannot be repeatedly sent on the plurality of subflows in a timely manner because of the small packet sending control policy, but the small packets continue to be sent after ACK packets corresponding to the small packets are returned. Consequently, data transmission efficiency is affected. To resolve the foregoing technical problem, the embodiments of this application provide the following solutions.

Figure 6:
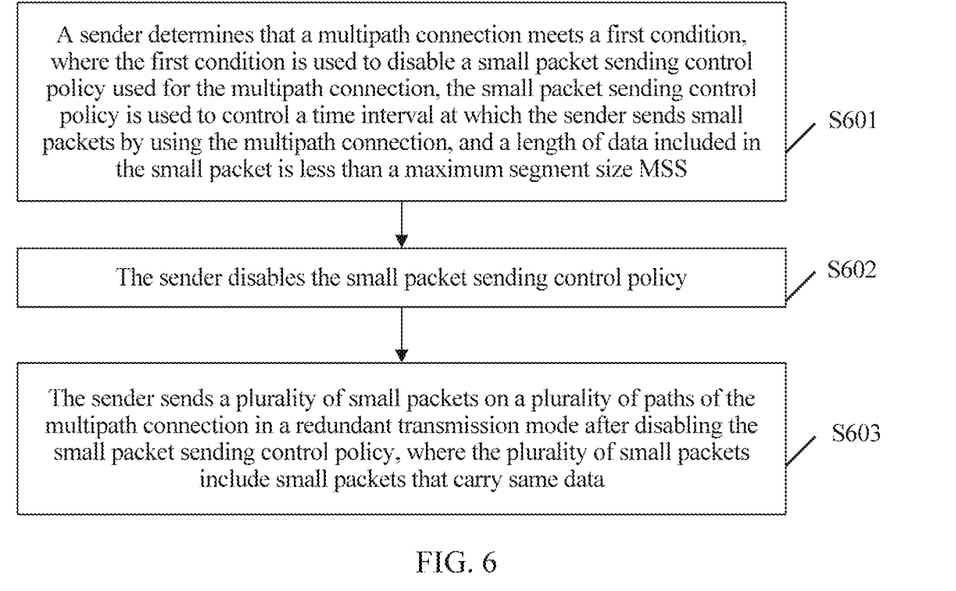
FIG. 6 is a schematic flowchart of a packet sending method according to an embodiment of this application.

FIG. 6 is a schematic flowchart of a packet sending method according to an embodiment of this application. The method includes but is not limited to the following steps.

S601. A sender determines that a multipath connection meets a first condition, where the first condition is used to disable a small packet sending control policy used for the multipath connection, the small packet sending control policy is used to control a time interval at which the sender sends small packets using the multipath connection, and a length of data included in the small packet is less than a MSS.

Specifically, the first condition includes at least one of the following a redundant scheduling policy has been configured for the sender, a scheduling policy of the multipath connection is a redundant scheduling policy, a redundant scheduling policy has been configured for a receiver of the multipath connection, the small packet is a packet sent using a redundant scheduling policy, the small packet needs to be repeatedly sent on another path of the multipath connection after being sent on one path of the multipath connection, and the sender currently sends packets on the plurality of paths of the multipath connection, where the redundant scheduling policy is used to instruct the sender to transmit data in the redundant transmission mode.

It should be understood that, after the sender sends a small packet on one path of the multipath connection, if the small packet is lost or fails to be sent in a transmission process, the small packet needs to be resent on another path of the multipath connection in the redundant transmission mode. In this case, the small packet sending control policy also needs to be disabled, and the small packet is resent on the other path in the redundant transmission mode after the small packet sending control policy is disabled.

A method for determining that the small packet is lost or fails to be sent in the transmission process includes at least the following. If the sender does not receive, within preset duration, an acknowledgement packet corresponding to a small packet after sending the small packet on one path of the multipath connection, the sender may determine that the small packet is lost or fails to be sent, or after sending a small packet on one path of the multipath connection, the sender sends a large packet on at least one path that is of the multipath connection and on which no small packets are sent, and if the sender does not receive an acknowledgement packet corresponding to the small packet before receiving an acknowledgement packet corresponding to the large packet, the sender may determine that the small packet is lost or fails to be sent. A length of data included in the large packet is not less than the MSS.

In this embodiment of this application, the time interval at which the sender sends the small packets using the multipath connection may be controlled in at least the following several optional manners.

In a first optional manner, after sending the small packet to the receiver, the sender is not allowed to send a small packet that carries same data as the small packet before receiving a returned ACK packet corresponding to the small packet. Specifically, the sender first sends the first small data packet, and temporarily stores the second small packet that arrives later. After receiving an ACK packet corresponding to the first small packet, the sender sends the temporarily stored second small packet, and continues to temporarily store the third small packet that arrives later. The sender continues to send a next small packet only after receiving an ACK packet of a previous small packet. For example, when a Nagle mechanism is started, when the sender has a small packet that has been sent but is not acknowledged, the sender is not allowed to continue to send a small packet.

In a second optional manner, a timing time is preset, and after sending the small packet to the receiver, the sender is not allowed to send a small packet that carries same data as the small packet before the preset timing time is reached. Specifically, the sender first sends the first small data packet, starts timing, and temporarily stores the second small packet that arrives later. When timing duration exceeds the timing time, the sender sends the temporarily stored second small packet, starts timing, and continues to temporarily store the third small packet that arrives later. The sender continues to send a next small packet only each time waiting duration exceeds the timing time.

In a third optional manner, a sending blocking condition is started, and the sending blocking condition is used to indicate that after sending the small packet, the sender is not allowed to send a small packet that carries same data as the small packet before receiving a returned ACK packet corresponding to the small packet. If small packets are combined into a large packet after a period of time, the sender may send the combined large packet to the receiver.

It should be noted that the data in the small packet in this embodiment of this application includes a header of a protocol above the TCP protocol, for example, a header of an RPC protocol or a header of an HTTP, but does not include a TCP header or a header at a lower layer (or bottom layer), for example, the ICMP. Therefore, the length of the data included in the small packet is a sum of a length of payload data and a length of the header of the protocol above the TCP protocol. When the sum of the length of the payload data and the length of the header of the protocol above the TCP protocol is less than the MSS, the small packet sending control policy takes effect, and whether to disable the small packet sending control policy used for the multipath connection needs to be determined.

It should be noted that, when the sender determines that the multipath connection does not meet the first condition, for example, when no redundant scheduling policies are configured for multipath connections of the sender and the receiver, the sender may schedule the small packet using the small packet sending control policy, and send the small packet on each path.

S602. The sender disables the small packet sending control policy in at least the following several optional manners.

In a first optional manner, the sender stops executing the small packet sending control policy. For example, the sender skips control logic corresponding to the small packet sending control policy when being to execute the control logic, or disables control logic corresponding to the small packet sending control policy after determining that the condition is met.

In a second optional manner, the sender modifies a sequence number corresponding to a first small packet in the sender, or modifies a sequence number of a first ACK packet received by the sender such that the sequence number corresponding to the first small packet in the sender is less than or equal to the sequence number of the first ACK packet, where the first small packet is a last small packet sent by the sender before a current moment, the sender does not receive an ACK packet corresponding to the first small packet, and the first ACK packet is an ACK packet with a largest sequence number that is received by the sender before the current moment. The current moment may be a current system time of the sender or a moment for modifying the sequence number.

In a third optional manner, the sender modifies a quantity of unacknowledged small packets stored in the sender into 0, where the quantity of unacknowledged small packets is used to indicate a quantity of small packets that have been sent by the sender but for which corresponding ACK packets are not received. Specifically, after sending the first small packet, the sender may immediately modify the quantity of unacknowledged small packets into 0 and then send the second small packet, and immediately modify the quantity of unacknowledged small packets into 0 and then send the third small packet. Each time after sending a previous small packet, the sender immediately modifies the quantity of unacknowledged small packets into 0, to send a next small packet.

In a fourth optional manner, a timer is used to control the time interval at which the sender sends the small packets using the multipath connection, and the sender modifies the timer after sending a first small packet using the multipath connection such that the timer reaches a preset time in advance, where the first small packet is a last small packet sent by the sender before a current moment. Duration of the preset time may be less than a transmission delay. The transmission delay may be a difference between a moment at which the sender receives an ACK packet corresponding to a small packet and a moment at which the sender sends the small packet. In addition, the current moment may be a current system time of the sender or a moment for modifying the sequence number.

S603. The sender sends a plurality of small packets on a plurality of paths of the multipath connection in a redundant transmission mode after disabling the small packet sending control policy, where the plurality of small packets include small packets that carry same data.

In a first optional manner, because the sender skips the control logic corresponding to the small packet sending control policy when being to execute the control logic, or disables the control logic corresponding to the small packet sending control policy after determining that the condition is met, the sender may send the plurality of small packets on the plurality of paths of the multipath connection in the redundant transmission mode.

In a second optional manner, after the sender modifies the sequence number corresponding to the first small packet in the sender, or modifies the sequence number of the first ACK packet received by the sender, the sequence number corresponding to the first small packet in the sender is less than or equal to the sequence number of the first ACK packet, which may indicate that the sender has received ACK packets corresponding to all the small packets. In this way, the sender may not need to wait to send the small packet after the ACK packet corresponding to the first small packet is returned in order to disable the small packet sending control policy. Therefore, the sender is allowed to send, on at least one path that is in the plurality of paths of the multipath connection and on which the first small packet is not sent, a small packet that carries same data as the first small packet. After sending the small packet that carries the same data as the first small packet, the sender may remodify the sequence number corresponding to the first small packet in the sender or remodify the sequence number of the first ACK packet received by the sender, which may also indicate that the sender has received ACK packets corresponding to all the small packets. In this way, the sender may not need to wait to send the small packet after the ACK packet corresponding to the small packet is returned in order to disable the small packet sending control policy, and send a second small packet on the plurality of paths of the multipath connection in the redundant transmission mode.

In a third optional manner, because the sender modifies the quantity of unacknowledged small packets stored in the sender into 0, the sender may not need to wait to send the small packet after the ACK packet corresponding to the unacknowledged small packet is returned in order to disable the small packet sending control policy. Then, the sender may send, on another path that is in the plurality of paths of the multipath connection and on which the first small packet is not sent, a small packet that carries same data as the first small packet. Next, the sender modifies the quantity of unacknowledged small packets into 0, and may send, on still another path that is in the plurality of paths of the multipath connection and on which the first small packet is not sent, a small packet that carries same data as the first small packet. By analogy, each time after a small packet is sent, the quantity of unacknowledged small packets is always 0, or the quantity of unacknowledged small packets is modified into 0, until all the small packets are sent.

In a fourth optional manner, after sending the first small packet using the multipath connection, the sender has modified the timer such that the timer reaches the preset time in advance. Therefore, before the sender receives the ACK packet corresponding to the first small packet, when the timer reaches the preset time in advance, the sender may send, before receiving the ACK packet corresponding to the first small packet, the small packet that carries same data as the first small packet, in the redundant transmission mode on a path that is in the plurality of paths of the multipath connection and on which the first small packet is not sent. In addition, after sending the small packet that carries the same data as the first small packet, the sender may remodify the timer such that the timer reaches the preset time in advance, and sends a second small packet on a path of the multipath connection when the timer reaches the preset time in advance again.

It should be understood that, when the timer reaches the preset time in advance, the small packet that carries the same data as the first small packet may be immediately sent on the path that is in the plurality of paths of the multipath connection and on which the first small packet is not sent. Alternatively, there is a latency in a code execution process or sending-related preparation steps (for example, packet encapsulation and transferring a packet to hardware, for example, a network interface card, for processing) in some existing packet sending procedures need to be performed. Therefore, when the timer reaches the preset time in advance, the timer may be delayed for a period of time, and then the small packet that carries the same data as the first small packet is sent on the path that is in the plurality of paths of the multipath connection and on which the first small packet is not sent.

In this way, when a protocol stack enables the small packet sending control policy, and data needs to be transmitted in the redundant transmission mode, the small packet sending control policy may be adaptively disabled when the condition is met, using an added determining mechanism, and there is no need to modify a default setting in the protocol stack that is for enabling the small packet sending control policy. After the small packet sending control policy is disabled, the plurality of small packets that carry the same data are sent on the plurality of paths in the redundant transmission mode, to improve data transmission efficiency.

It should be noted that in the multipath connection-based packet sending method described in this application, at least one of the sender and the receiver may be a terminal, or a gateway that supports the MPTCP, or a server that supports the MPTCP. It should be understood that, before the method in this embodiment of this application is performed, an operating system that supports the MPTCP and a driver of a micro port should be installed on the sender and the receiver.

It should be noted that in this embodiment of this application, the sender and the receiver access a network using an access node. The access node is specially an access node of a wireless network. Specifically, the access node may be an access point of a WI-FI network, a router, an access point of a Worldwide Interoperability for Microwave Access (WiMAX) network, a base station of a wireless cellular mobile network, or the like. A type of the wireless network and a specific form of the access node of the wireless network are not limited in this application. In addition, wireless networks of a same type are access nodes that all belong to the WI-FI network, access nodes that all belong to the WiMAX network, or access nodes that all belong to the wireless cellular network, for example, a 2G network, a 3G network, a 4G network, or a 5G network.

The method in the embodiments of this application is described above in detail, and the following provides an apparatus according to an embodiment of this application.

FIG. 7 is a schematic structural diagram of a packet sending apparatus according to an embodiment of this application. The packet sending apparatus may include a determining module 701, a processing module 702, and a sending module 703. The determining module 701 is configured to determine that a multipath connection meets a first condition. The first condition is used to disable a small packet sending control policy used for the multipath connection, the small packet sending control policy is used to control a time interval at which the sender sends small packets using the multipath connection, and a length of data included in the small packet is less than an MSS.

The processing module 702 is configured to disable the small packet sending control policy. The sending module 703 is configured to send a plurality of small packets on a plurality of paths of the multipath connection in a redundant transmission mode after the small packet sending control policy is disabled. The plurality of small packets include small packets that carry same data.

The first condition includes at least one of the following a redundant scheduling policy has been configured for the sender, a scheduling policy of the multipath connection is a redundant scheduling policy, a redundant scheduling policy has been configured for a receiver of the multipath connection, the small packet is a packet sent using a redundant scheduling policy, and the sender currently sends packets on the plurality of paths of the multipath connection. The redundant scheduling policy is used to instruct the sender to transmit data in the redundant transmission mode.

Optionally, the processing module 702 is further configured to modify a sequence number corresponding to a first small packet in the sender, or modify a sequence number of a first ACK packet received by the sender such that the sequence number corresponding to the first small packet in the sender is less than or equal to the sequence number of the first ACK packet, where the first small packet is a last small packet sent by the sender before a current moment, the sender does not receive an ACK packet corresponding to the first small packet, and the first ACK packet is an ACK packet with a largest sequence number that is received by the sender before the current moment.

Correspondingly, the sending module 703 is further configured to send, on at least one path that is in the plurality of paths of the multipath connection and on which the first small packet is not sent, a small packet that carries same data as the first small packet, and send a second small packet on the plurality of paths of the multipath connection in the redundant transmission mode.

Optionally, the processing module 702 is further configured to modify a quantity of unacknowledged small packets stored in the sender into 0, where the quantity of unacknowledged small packets is used to indicate a quantity of small packets that have been sent by the sender but for which corresponding ACK packets are not received.

Optionally, a timer is used to control the time interval at which the sender sends the small packets using the multipath connection, and the processing module 702 is further configured to modify the timer after a first small packet is sent using the multipath connection such that the timer reaches a preset time in advance, where the first small packet is a last small packet sent by the sender before a current moment.

Correspondingly, the sending module 703 is further configured to, when the timer reaches the preset time in advance, send in the redundant transmission mode on a path that is in the plurality of paths of the multipath connection and on which the first small packet is not sent, a small packet that carries same data as the first small packet, and remodify the timer after sending the small packet that carries the same data as the first small packet such that the timer reaches the preset time in advance, and send a second small packet on a path of the multipath connection when the timer reaches the preset time in advance again.

It should be noted that for implementation of each unit, refer to the corresponding description of the method embodiment shown in FIG. 6.

In this way, when a protocol stack enables the small packet sending control policy, and data needs to be transmitted in the redundant transmission mode, the small packet sending control policy can be adaptively disabled when the condition is met, using an added determining mechanism, and there is no need to modify a default setting in the protocol stack that is for enabling the small packet sending control policy. After the small packet sending control policy is disabled, the small packets that carry same data are sent on the plurality of paths in the redundant transmission mode, to improve data transmission efficiency.

Figure 8:
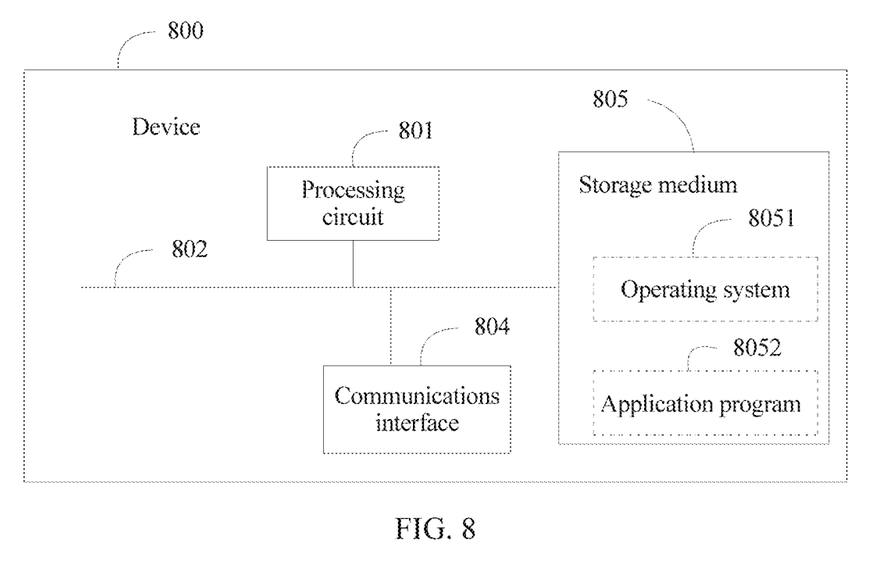
FIG. 8 is a schematic structural diagram of a device according to an embodiment of this application.

FIG. 8 is a schematic structural diagram of a device 800 according to an embodiment of this application. The method in the embodiments of this application is applied to the device 800. The device 800 includes at least one processing circuit 801, and a communications interface 804. The communications interface 804 includes at least one physical network interface card. In an implementation, the physical network interface card corresponds to a plurality of virtual network interface cards. The plurality of virtual network interface cards are in a one-to-one correspondence with a plurality of ports, which are not marked in the diagram. The device 800 further includes a storage medium 805 and at least one communications bus 802. The communications bus 802 is configured to implement connection and communication between these components.

In an implementation, the device 800 may be a terminal device. When the device 800 is the terminal device, the device 800 optionally includes a user interface 803, including a display (for example, a touchscreen, an liquid-crystal display (LCD), a cathode-ray tube (CRT), holographic imaging device, or a projector), a keyboard, or a click device (for example, a mouse, a trackball, a touch panel, or a touchscreen). The storage medium 805 may include a read-only memory and a random access memory, and provide an instruction and data for the processing circuit 801. A part of the storage medium 805 may further include a non-volatile random access memory (NVRAM).

In some implementations, for example, when the device is a terminal or a server, the storage medium 805 stores the following elements an executable module or a data structure, a subset thereof, or an extension set thereof an operating system 8051 that includes various system programs such as a frame layer, a kernel library layer, and a driver layer and that is configured to implement various basic services and process a hardware-based task, and an application program module 8052 that includes various application programs such as a launcher, a media player, and a browser and that is configured to implement various application services. When the device is a gateway, the storage medium 805 may store only program code required for performing the foregoing method (which for example includes receiving or sending a packet, receiving or sending an acknowledgement packet, and analyzing the received packet or analyzing the received acknowledgement packet).

The device may be the terminal, the gateway, or the server. For details, refer to the information in FIG. 1 to FIG. 4. For example, when the device is the terminal, refer to the architectural diagram of the terminal and the related description in FIG. 2. The device may invoke a program in the storage medium 805 using the processing circuit 801 such that the processing circuit 801 performs the method and the embodiments in the foregoing diagrams using the communications interface 804. For example, the device may be a sender or a receiver of a multipath connection. For specific implementations, related descriptions, and beneficial effects, refer to the foregoing descriptions. Details are not described herein again. For example, the processing circuit 801 may implement, using the communications interface 804, the functions of the determining module 701, the processing module 702, and the sending module 703 in the apparatus shown in FIG. 7. For example, the sending module 703 may be a communications interface invoked by different processes or threads.

Another embodiment of this application further records a chip. The chip may be disposed on the foregoing sender, and is configured to perform the method described in this application, to parse and process the small packet in the foregoing method in this application. The chip may be further disposed on the foregoing receiver, and is configured to perform the method described in this application, for example, after receiving a small packet, generate an acknowledgement packet described in the foregoing method in this application.

A person of ordinary skill in the art may understand that all or some of the processes of the methods in the embodiments may be implemented by a computer program instructing related hardware (such as a processor). The program may be stored in a computer readable storage medium. When the program is executed, the processes of the method embodiments are performed. The storage medium may be a magnetic disk, an optical disc, a read-only memory (ROM), a random-access memory (RAM), or the like.

The above is a packet sending method and apparatus provided in the embodiments of this application. The foregoing embodiments are merely intended to help understand the method and idea of this application. In addition, with respect to the implementations and the application scope, modifications may be made by a person of ordinary skill in the art according to the idea of this application. Therefore, the specification shall not be construed as a limitation on this application.

A person of ordinary skill in the art may understand that all or some of the processes of the methods in the embodiments may be implemented by a computer program instructing related hardware. The program may be stored in a computer readable storage medium. When the program is executed, the processes of the method embodiments are performed. The foregoing storage medium includes any medium that can store program code, such as a ROM, a random access memory RAM, a magnetic disk, or an optical disc.

What is claimed is:

1. A packet sending method, implemented by a sender of a multipath connection, wherein the packet sending method comprises:
   when the multipath connection meets a first condition for disabling a small packet sending control policy of the multipath connection, disabling the small packet sending control policy, wherein the small packet sending control policy controls a time interval at which the sender sends a plurality of first small packets using the multipath connection, and wherein a length of data comprised in the first small packets is less than a maximum segment size (MSS);
   and
   sending second small packets on a plurality of paths of the multipath connection in a redundant transmission mode after disabling the small packet sending control policy, wherein a length of data comprised in the second small packets is less than the MSS,
   wherein the first condition indicates that one of the first small packets is sent using a redundant scheduling policy or that one of the first small packets is to be repeatedly sent on another path of the multipath connection after being sent on one path of the multipath connection, and
   wherein the redundant scheduling policy instructs the sender to transmit data in the redundant transmission mode.

2. The packet sending method of claim 1, wherein the first condition further indicates that the redundant scheduling policy has been configured for the sender, a scheduling policy of the multipath connection is the redundant scheduling policy, the redundant scheduling policy has been configured for a receiver of the multipath connection, or packets on the plurality of paths of the multipath connection are being sent by the sender.

3. The packet sending method of claim 1, further comprising:
   modifying a sequence number corresponding to a first small packet in the sender, wherein the first small packet is a last small packet from the sender before a current moment, wherein the sender does not receive an acknowledgement (ACK) packet corresponding to the first small packet;
   sending, on at least one path that is in the paths of the multipath connection and on which the first small packet is not sent, a second small packet that carries same data as the first small packet; and
   sending a third small packet on the paths of the multipath connection in the redundant transmission mode.

4. The packet sending method of claim 1, further comprising:
   modifying a sequence number of a first ACK packet received by the sender such that the sequence number corresponding to a first small packet in the sender is less than or equal to the sequence number of the first ACK packet, wherein the first small packet is a last small packet from the sender before a current moment, wherein the sender does not receive an ACK packet corresponding to the first small packet, and wherein the first ACK packet is an ACK packet with a largest sequence number that is received by the sender before the current moment;
   sending, on at least one path that is in the paths of the multipath connection and on which the first small packet is not sent, a second small packet that carries same data as the first small packet; and
   sending a third small packet on the paths of the multipath connection in the redundant transmission mode.

5. The packet sending method of claim 1, further comprising setting a quantity of unacknowledged small packets stored in the sender to 0, wherein the quantity of unacknowledged small packets indicates a quantity of small packets that are from the sender but for which corresponding ACK packets are not received.

6. The packet sending method of claim 1, further comprising:
- sending the first small packets using the multipath connection, wherein a timer controls a time interval at which the small packets are sent;
- modifying the timer after sending a first small packet using the multipath connection such that the timer reaches a preset time in advance, wherein the first small packet is a last small packet from the sender before a current moment;
- sending, in the redundant transmission mode on a path that is in the plurality of paths of the multipath connection and on which the first small packet is not sent, a second small packet that carries same data as the first small packet when the timer reaches the preset time in advance;
- remodifying the timer after sending the second small packet that carries the same data as the first small packet such that the timer reaches the preset time in advance; and
- sending a third small packet on a path of the multipath connection when the timer reaches the preset time in advance again.

7. The packet sending method of claim 1, further comprising stopping the small packet sending control policy.

8. A packet sending device, comprising:
- a processor; and
- a memory coupled to the processor and storing instructions that, when executed by the processor, cause the packet sending device to be configured to:
  - when a multipath connection meets a first condition for disabling a small packet sending control policy of the multipath connection, disable the small packet sending control policy, wherein the small packet sending control policy controls a time interval at which the packet sending device sends a plurality of first small packets using the multipath connection, and wherein a length of data comprised in the first small packet is less than a maximum segment size (MSS); and
  - send second small packets on a plurality of paths of the multipath connection in a redundant transmission mode after disabling the small packet sending control policy, wherein a length of data comprised in the second small packets is less than the MSS,
  - wherein the first condition indicates that one of the first small packets is sent using a redundant scheduling policy or that one of the first small packets is to be repeatedly sent on another path of the multipath connection after being sent on one path of the multipath connection, and
  - wherein the redundant scheduling policy instructs the sender to transmit data in the redundant transmission mode.

9. The packet sending device of claim 8, wherein the first condition further indicates that the redundant scheduling policy has been configured for the packet sending device, a scheduling policy of the multipath connection is the redundant scheduling policy, the redundant scheduling policy has been configured for a receiver of the multipath connection, or packets on the plurality of paths of the multipath connection are being sent by the sender.

10. The packet sending device of claim 8, wherein the instructions further cause the packet sending device to be configured to:
- modify a sequence number corresponding to a first small packet in the packet sending device, wherein the first small packet is a last small packet from the packet sending device before a current moment, and wherein the packet sending device does not receive an acknowledgement (ACK) packet corresponding to the first small packet;
- send, on at least one path that is in the paths of the multipath connection and on which the first small packet is not sent, a second small packet that carries same data as the first small packet; and
- send a third small packet on the paths of the multipath connection in the redundant transmission mode.

11. The packet sending device of claim 8, wherein the instructions further cause the packet sending device to be configured to:
- modify a sequence number of a first acknowledgement (ACK) packet received by the packet sending device such that the sequence number corresponding to a first small packet in the packet sending device is less than or equal to the sequence number of the first ACK packet, wherein the first small packet is a last small packet from the packet sending device before a current moment, wherein the packet sending device does not receive an ACK packet corresponding to the first small packet, and wherein the first ACK packet is an ACK packet with a largest sequence number that is received by the packet sending device before the current moment;
- send, on at least one path that is in the paths of the multipath connection and on which the first small packet is not sent, a second small packet that carries same data as the first small packet; and
- send a third small packet on the paths of the multipath connection in the redundant transmission mode.

12. The packet sending device of claim 8, wherein the instructions further cause the packet sending device to be configured to set a quantity of unacknowledged small packets stored in the packet sending device to 0, and wherein the quantity of unacknowledged small packets indicates a quantity of small packets that are from the packet sending device but for which corresponding ACK packets are not received.

13. The packet sending device of claim 8, wherein the packet sending device further comprises a timer configured to control the time interval at which the packet sending device sends the first small packets using the multipath connection, wherein the instructions further cause the processor to be configured to:
- modify the timer after sending a first small packet using the multipath connection such that the timer reaches a preset time in advance, wherein the first small packet is a last small packet from the packet sending device before a current moment;
- send, in the redundant transmission mode on a path that is in the plurality of paths of the multipath connection and on which the first small packet is not sent, a second small packet that carries same data as the first small packet when the timer reaches the preset time in advance;
- remodify the timer after sending the second small packet that carries the same data as the first small packet such that the timer reaches the preset time in advance; and
- send a third small packet on a path of the multipath connection when the timer reaches the preset time in advance again.

14. The packet sending device of claim 8, wherein the instructions further cause the packet sending device to be configured to stop the small packet sending control policy.

15. A computer program product comprising computer-executable instructions for storage on a non-transitory computer-readable medium that, when executed by a processor, cause a computer to:
when the multipath connection meets a first condition for disabling a small packet sending control policy of the multipath connection, disable the small packet sending control policy, wherein the small packet sending control policy controls a time interval at which the sender sends a plurality of first small packets using the multipath connection, and wherein a length of data comprised in the first small packets is less than a maximum segment size (MSS); and
send second small packets on a plurality of paths of the multipath connection in a redundant transmission mode after disabling the small packet sending control policy, wherein a length of data comprised in the second small packets is less than the MSS,
wherein the first condition indicates that one of the first small packets is sent using a redundant scheduling policy or that one of the first small packets is to be repeatedly sent on another path of the multipath connection after being sent on one path of the multipath connection, and
wherein the redundant scheduling policy instructs the sender to transmit data in the redundant transmission mode.

16. The computer program product of claim 15, wherein the first condition further indicates that the redundant scheduling policy has been configured for the packet sending device, a scheduling policy of the multipath connection is the redundant scheduling policy, the redundant scheduling policy has been configured for a receiver of the multipath connection, or packets on the plurality of paths of the multipath connection are being sent by the sender.

17. The computer program product of claim 15, wherein the instructions further cause the computer to:
modify a sequence number corresponding to a first small packet in the computer or modifying a sequence number of a first acknowledgement (ACK) packet received by the computer such that the sequence number corresponding to the first small packet in the computer is less than or equal to the sequence number of the first ACK packet, wherein the first small packet is a last small packet from the computer before a current moment, wherein the computer does not receive an ACK packet corresponding to the first small packet, and wherein the first ACK packet is an ACK packet with a largest sequence number that is received by the computer before the current moment;
send, on at least one path that is in the paths of the multipath connection and on which the first small packet is not sent, a second small packet that carries same data as the first small packet; and
send a third small packet on the paths of the multipath connection in the redundant transmission mode.

18. The computer program product of claim 15, wherein the instructions further cause the computer to set a quantity of unacknowledged small packets stored in the computer to 0, and wherein the quantity of unacknowledged small packets indicates a quantity of small packets that are from the computer but for which corresponding ACK packets are not received.

19. The computer program product of claim 15, wherein the instructions further cause the computer to:
control a timer to set the time interval at which the computer sends the first small packets using the multipath connection;
modify the timer after sending a first small packet using the multipath connection such that the timer reaches a preset time in advance, wherein the first small packet is a last small packet from the computer before a current moment;
send, in the redundant transmission mode on a path that is in the plurality of paths of the multipath connection and on which the first small packet is not sent, a second small packet that carries same data as the first small packet when the timer reaches the preset time in advance;
remodify the timer after sending the second small packet that carries the same data as the first small packet such that the timer reaches the preset time in advance; and
send a third small packet on a path of the multipath connection when the timer reaches the preset time in advance again.

20. The computer program product of claim 15, wherein the instructions further cause the computer to stop the small packet sending control policy.

* * * * *